US008074272B2

(12) United States Patent
Choi et al.

(10) Patent No.: US 8,074,272 B2
(45) Date of Patent: Dec. 6, 2011

(54) BROWSER SECURITY NOTIFICATION

(75) Inventors: Wayne Choi, Redmond, WA (US); Sean O. Lyndersay, Seattle, WA (US); Roberto A. Franco, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1097 days.

(21) Appl. No.: 11/176,754

(22) Filed: Jul. 7, 2005

(65) Prior Publication Data
US 2007/0016954 A1    Jan. 18, 2007

(51) Int. Cl.
*H04L 29/06* (2006.01)
*G06F 21/06* (2006.01)
(52) U.S. Cl. ............................................. 726/17; 726/22
(58) Field of Classification Search .................. 713/187, 713/188, 152; 707/9; 726/1, 23, 24, 25, 726/26, 27
See application file for complete search history.

(56) References Cited

U.S. PATENT DOCUMENTS

| 5,404,488 | A |  | 4/1995 | Kerrrigan et al. |
| 5,649,186 | A |  | 7/1997 | Ferguson |
| 5,819,284 | A |  | 10/1998 | Farber et al. |
| 5,880,767 | A |  | 3/1999 | Liu |
| 5,926,796 | A |  | 7/1999 | Walker et al. |
| 5,974,549 | A |  | 10/1999 | Golan |
| 6,085,186 | A |  | 7/2000 | Christianson et al. |
| 6,094,657 | A |  | 7/2000 | Hailpern et al. |
| 6,282,546 | B1 |  | 8/2001 | Gleichauf et al. |
| 6,366,912 | B1 | * | 4/2002 | Wallent et al. ........................ 1/1 |
| 6,411,331 | B1 |  | 6/2002 | Sansom-Wai et al. |
| 6,434,745 | B1 |  | 8/2002 | Conley, Jr. et al. |
| 6,544,295 | B1 |  | 4/2003 | Bodnar |
| 6,594,692 | B1 |  | 7/2003 | Reisman |
| 6,694,431 | B1 |  | 2/2004 | Binding et al. |
| 6,708,172 | B1 |  | 3/2004 | Wong et al. |
| 6,732,102 | B1 |  | 5/2004 | Khandekar |
| 6,766,458 | B1 | * | 7/2004 | Harris et al. ........................ 726/6 |
| 6,775,772 | B1 |  | 8/2004 | Binding et al. |
| 6,874,084 | B1 |  | 3/2005 | Dobner et al. |
| 7,065,644 | B2 | * | 6/2006 | Daniell et al. ................. 713/166 |
| 7,143,084 | B1 |  | 11/2006 | Rinearson et al. |
| 7,257,564 | B2 |  | 8/2007 | Loughmiller et al. |
| 2002/0108115 | A1 |  | 8/2002 | Palmer |
| 2002/0116630 | A1 |  | 8/2002 | Stehlin |
| 2002/0124172 | A1 |  | 9/2002 | Manahan |
| 2002/0156905 | A1 |  | 10/2002 | Weissman |

(Continued)

FOREIGN PATENT DOCUMENTS
CA    2496672    2/2004
(Continued)

OTHER PUBLICATIONS

Microsoft. "Increase Your Browsing and E-Mail Safety" website at http://www.microsoft.com/security/incident/settings.mspx, Oct. 3, 2003, 4 pages, printed Jul. 7, 2005.

(Continued)

*Primary Examiner* — Gilberto Barron, Jr.
*Assistant Examiner* — Izunna Okeke

(57) ABSTRACT

Tools are described that notify a user of a security risk in a network browser. The tools can determine that a security setting of a network browser poses a security risk and notify the user of this risk. In some situations the tools also enable a user to reduce the security risk with a single user action. This single user action can alter one or multiple security settings responsible for the security risk.

12 Claims, 7 Drawing Sheets

U.S. PATENT DOCUMENTS

| | | | |
|---|---|---|---|
| 2002/0174201 A1 | 11/2002 | Ramer et al. |
| 2002/0184491 A1 | 12/2002 | Morgan et al. |
| 2002/0194151 A1 | 12/2002 | Fenton et al. |
| 2003/0014406 A1 | 1/2003 | Faieta et al. |
| 2003/0028762 A1 | 2/2003 | Trilli et al. |
| 2003/0117511 A1 | 6/2003 | Belz et al. |
| 2003/0135504 A1 | 7/2003 | Elvanoglu et al. |
| 2003/0167402 A1 | 9/2003 | Stolfo et al. |
| 2004/0003097 A1 | 1/2004 | Willis et al. |
| 2004/0046885 A1 | 3/2004 | Regan et al. |
| 2004/0093563 A1 | 5/2004 | Pasquali |
| 2004/0143683 A1 | 7/2004 | Greenwood |
| 2004/0181753 A1 | 9/2004 | Michaelides |
| 2004/0225749 A1 | 11/2004 | Pavlik et al. |
| 2004/0230676 A1 | 11/2004 | Spivack et al. |
| 2004/0250115 A1 | 12/2004 | Gemmel et al. |
| 2005/0010595 A1 | 1/2005 | Brown et al. |
| 2005/0015452 A1 | 1/2005 | Corson |
| 2005/0033657 A1 | 2/2005 | Herrington et al. |
| 2005/0038717 A1 | 2/2005 | McQueen, II |
| 2005/0050460 A1 | 3/2005 | Bedingfield, Sr. |
| 2005/0065906 A1 | 3/2005 | Romero |
| 2005/0097180 A1 | 5/2005 | Abdelhak |
| 2005/0108227 A1 | 5/2005 | Russell-Falla et al. |
| 2005/0119910 A1 | 6/2005 | Schneider |
| 2005/0119913 A1 | 6/2005 | Hornreich et al. |
| 2005/0165615 A1 | 7/2005 | Minar |
| 2005/0171836 A1 | 8/2005 | Leacy |
| 2005/0216439 A1 | 9/2005 | Kawakita |
| 2005/0256768 A1 | 11/2005 | Robinson |
| 2005/0268100 A1 | 12/2005 | Gasparini et al. |
| 2006/0053293 A1 | 3/2006 | Zager et al. |
| 2006/0218403 A1 | 9/2006 | Sauve et al. |
| 2006/0230021 A1 | 10/2006 | Diab et al. |
| 2007/0061711 A1 | 3/2007 | Bodin et al. |
| 2007/0094389 A1 | 4/2007 | Nussey et al. |
| 2007/0100836 A1 | 5/2007 | Eichstaedt et al. |
| 2007/0100959 A1 | 5/2007 | Eichstaedt et al. |
| 2007/0130518 A1 | 6/2007 | Shavit et al. |
| 2007/0282973 A1 | 12/2007 | Chapman et al. |

FOREIGN PATENT DOCUMENTS

| | | |
|---|---|---|
| WO | WO 02/07013 | 1/2002 |
| WO | WO 2004/107216 | 12/2004 |
| WO | WO2005027402 | 3/2005 |

OTHER PUBLICATIONS

Microsoft, Andersen et al. "Changes to Functionality in Microsoft Windows XP Service Pack 2", website at http://www.microsoft.com/technet/prodtechnol/winxppro/maintain/sp2brows.mspx, Aug. 9, 2004, 58 pages, printed Jul. 7, 2005.

Mozilla, "Why Use Firefox", website at http://www.mozilla.org/products/firefox, Jun. 17, 2005, 3 pages, printed Jul. 7, 2005.

ATPM, Tetrault, Gregory, "Review: Anonymizer Ultimate Security Suite", website at http://www.atpm.com/8/.09/anonymizer.shtml, Sep. 2002, 12 pages, printed Jul. 7, 2005.

"Google Search Appliance Feeds Protocol Developer's Guide", Google Inc., Jun. 2, 2005, printed from website: http://code.google.com/gsa_apis/feedsguide.html, 11 pages.

"iSpeak It: Web Feeds and Podcasts", ZappTek, 2002, printed from website: http://www.zapptek.com/ispeak-it/webpage.html, 3 pages.

"Mac OS X Server", Apple Computer Inc., 2005, printed from website: http://www.apple.com/server/macosx/features/collaborationservices.html., 3 pages.

"MX RSS Reader-Writer: Use RSS feeds in your sites", InterAKT, printed Jun. 21, 2005 from website: http://www.interaktonline.com/Products/Dreamweaver-Extensions/MXRSSReader-Writer/Overview/?from=gg_rss, 2 pages.

"Safari RSS: Your Desktop is the new doorstep", Apple Computer Inc., 2005, printed from website: http://www.apple.com/macosx/features/safari/, 3 pages.

"Dreams of a Rarebit Fiend", printed on Jun. 21, 2005 from website: http://www.johnmunsch.com/projects/HotSheet/, 6 pages.

"Latest Headline Viewer news and information", Version: 0.9.9, Mar. 2, 2005, printed from website: http://www.headlineviewer.com/news/index.shtml, 3 pages.

"Project: RSS Viewer: Summary", SourceForge, 2005, printed from website: http://sourceforge.net/projects/rssview/, 3 pages.

"Welcome to Feed on Feeds, your server side personal RSS(and Atom!) aggregator", printed on Jun. 21, 2005 from website: http://feedonfeeds.com/, 4 pages.

"What is Reptile?", printed on Jun. 21, 2005 from website: http://reptile.openprivacy.org/overview.html, 2001, 4 pages.

"Six Apart: Developer Documentation : Trackback Technical Specificaton", << http://www.sixapart.com/pronet/docs/trackback_spec>>, 5 pages.

Wikipedia, "RSS", retrieved at <<http://en.wikipedia.org/w/index.php?title=RSS&direction=next&oldid=18620370>>, on Feb. 16, 2008, 4 pages.

Wikipedia, "Trackback", retrieved at <<http://en.wikipedia.org/w/index.php?title=Trackback&oldid=16308389>>, on Feb. 15, 2008, 1 page.

Verisign Inc., "Licensing verisign certificates: securing multiple web server and domain configurations", www.msctrustgate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

Ncipher Inc., "Protecting commercial secure web servers from key-finding treats", www.ncipher.com/uploads/resources/pcws.pdf, white paper,(1999).

"Extended EP Search Report", European Patent Application No. 06786267.2, (May 21, 2010),5 pages.

"Foreign Office Action", Chinese Application No. 200680024442.3, (Oct. 20, 2010), 9 pages.

"PCT Search Report and Written Opinion", Application No. PCT/US06/26057, (Jul. 14, 2008), 12 pages.

* cited by examiner

| | Zones | | | |
|---|---|---|---|---|
| | Internet | Local Intranet | Trusted | Restricted |
| Download Signed Active X Controls | E | P | E | D |
| Download un-Signed Active X Controls | E | D | P | D |
| Initialize and script Active X controls not marked as safe | D | D | P | D |
| Run ActiveX controls and plug-ins | E | E | E | D |
| Script ActiveX controls marked safe for scripting | E | E | E | D |
| File download | E | E | E | P |
| Installation of desktop items | P | P | E | D |
| Launching applications and unsafe files | P | E | E | P |
| Launching programs and files in an IFRAME | P | E | E | D |

FIG. 4

BROWSER SECURITY NOTIFICATION

BACKGROUND

When set properly, a network browser's security settings can help protect the browser and its user and computer from malicious code. A browser's security settings can be altered, however. Malicious code may alter a browser's security settings to misuse the browser. Users may also alter these settings. A user can alter settings in response to an application or website instructing the user to change his or her settings to improve the browser's performance, for instance.

Security settings altered to reduce a browser's security can place the computer on which the browser operates, a user, and the network browser at risk. For example, a browser having improper security settings can permit malicious code to track a user's use of his or her browser and invade the user's privacy.

SUMMARY

Tools are described that notify a user of a security risk in a network browser. The tools can determine that a security setting of a network browser poses a security risk and notify the user of this risk. In some situations the tools also enable a user to reduce the security risk utilizing a single user action. This single user action can alter one or multiple security settings responsible for the security risk.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

FIG. 4 illustrates exemplary altered security settings.

The same numbers are used throughout the disclosure and figures to reference like components and features.

DETAILED DESCRIPTION

Overview

The following document describes system(s) and/or method(s) ("tools") for notifying a user of a security risk in a network browser. In one embodiment, the tools determine that a security setting of a network browser poses a security risk and notifies the user of this risk. In another embodiment, the tools notify a user of a security risk and enable the user to reduce this security risk with a single user action. This single user action can alter one or multiple security settings responsible for the security risk.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
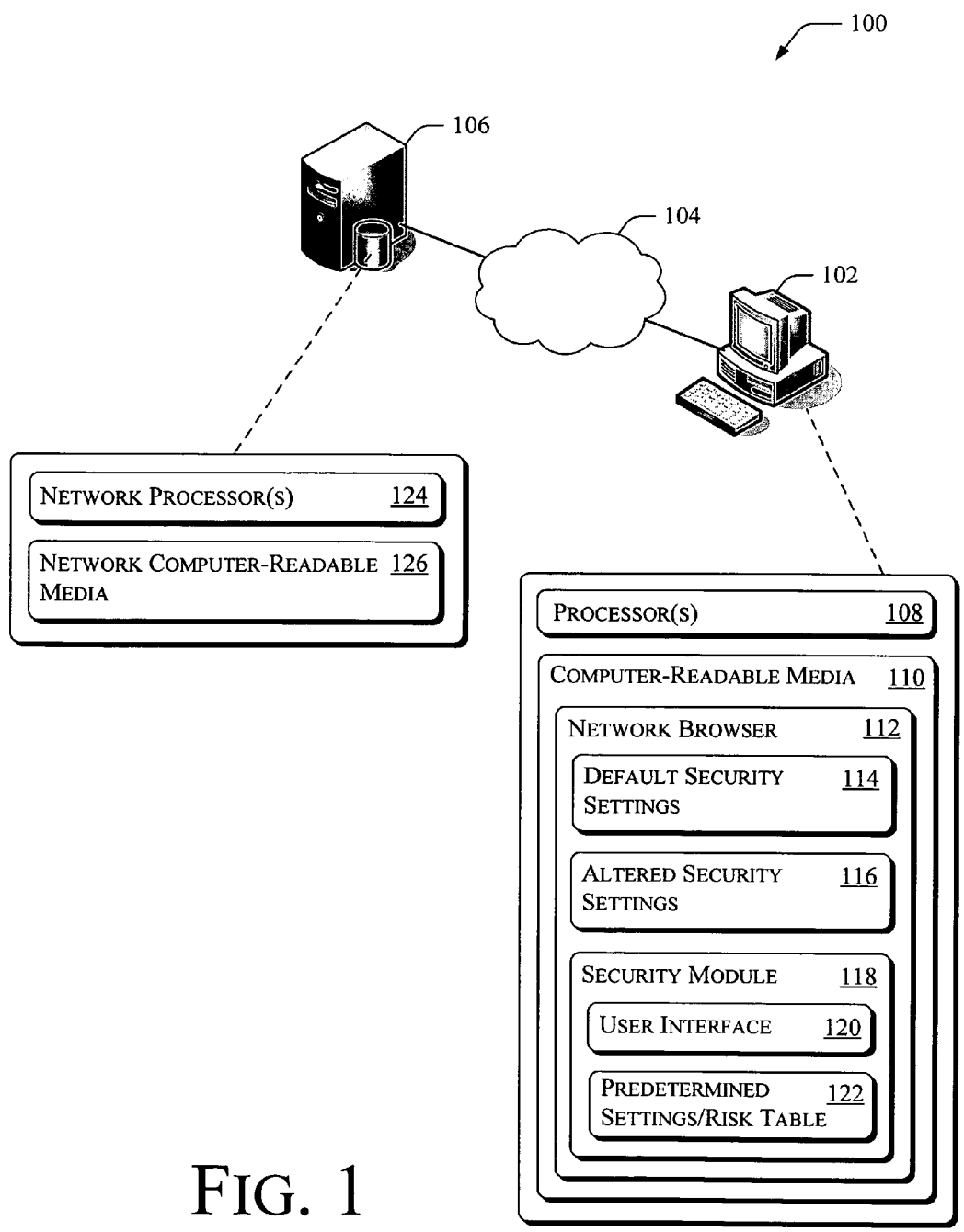
FIG. 1 illustrates an exemplary operating environment in which various embodiments can operate.

FIG. 1 illustrates one such operating environment generally at 100 comprising a computer 102, a communication network 104, and a network computer 106. The computer is shown comprising one or more processor(s) 108 and computer-readable media 110. The processor(s) are capable of executing instructions on the computer-readable media. The computer-readable media comprises instructions that implement a network browser 112 having default security settings 114 or altered security settings 116 and a security module 118. In at least some embodiments, the computer-readable media 110 include computer-readable storage media that are configured to store information, such as computer-executable instructions. Computer-readable storage media are configured to store information and thus exclude transitory signals. The security module may comprise a user interface 120 and a predetermined settings/risk table 122. The security module and the user interface are shown integral with the network browser, though they may also be separate from the browser. If separate, the security module and/or user interface are capable of communicating with the network browser, such as through one or more application programming interfaces (APIs).

The predetermined settings/risk table maps possible security settings for the network browser with a security risk assessment for these settings. Particular settings may be assigned a risk level of unsafe or safe. Those given an unsafe risk level can be those settings that permit a user's browsing experience to be damaged, a user's computer to be damaged, and the like. This table enables a Boolean assessment of risk (two levels—unsafe and safe) though it may also enable a range of assessment, such as three or more levels. For relatively unsophisticated users, two levels may be appropriate so as not to confuse them. For some other users—like information technologists—many levels may be more appropriate.

The communication network enables communication between the computer and the network computer and may comprise one or more of an intranet, such as a company's internal network, the Internet, and the like. Network computer 106 is shown comprising one or more network processor(s) 124 and network computer-readable media 126. The network processor(s) are capable of executing the network computer-readable media.

Notifying a User of a Security Risk

Figure 2:
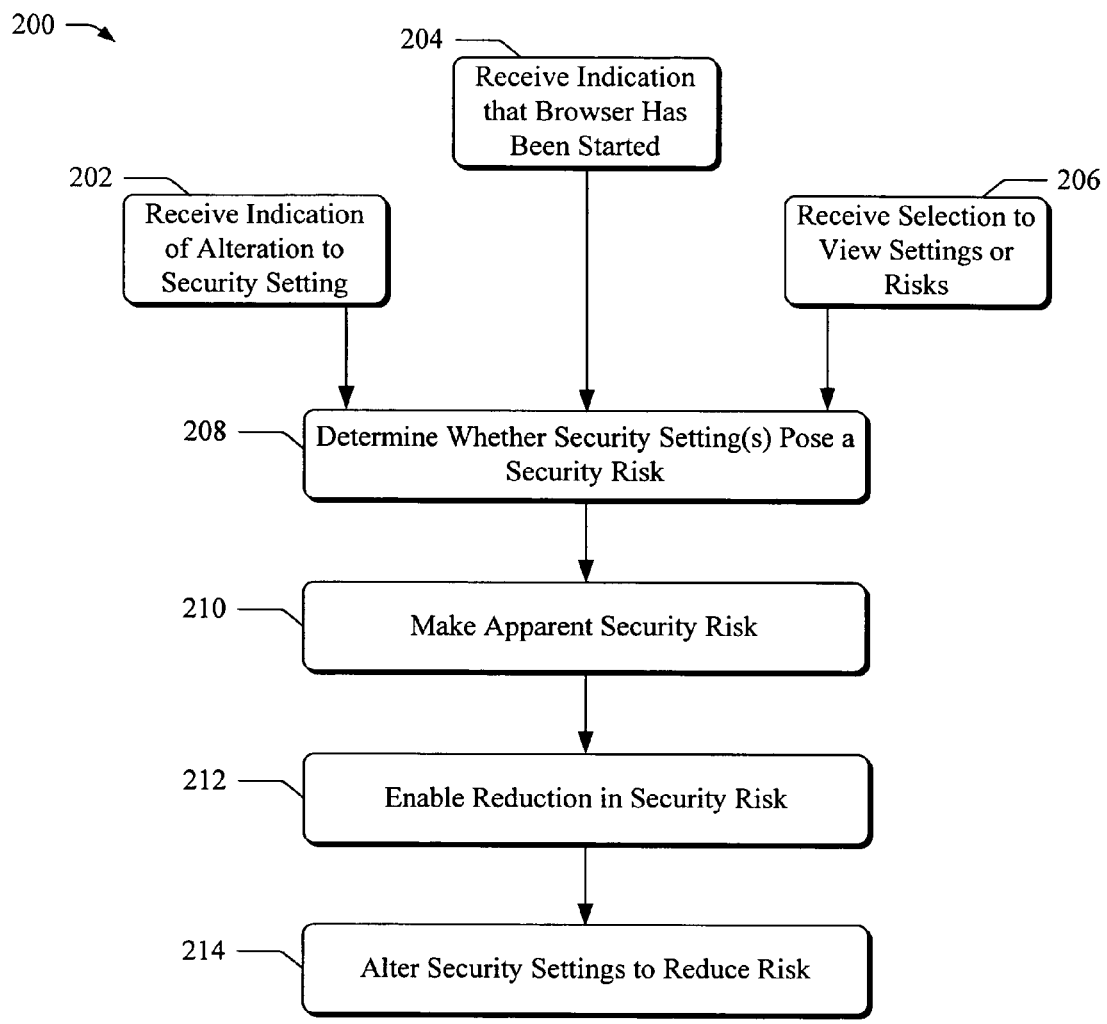
FIG. 2 is an exemplary process for notifying a user of a security risk.

Referring to FIG. 2, an exemplary process 200 for notifying a user of a security risk is shown. The process 200 is illustrated as a series of blocks representing individual operations or acts performed by elements of environment 100. This process is directed to these elements to aid the reader in understanding particular embodiments of the tools and is not intended to limit application of the tools to this environment. This process can be implemented in any suitable hardware, software, firmware, or combination thereof. In the case of software and firmware, this process represents sets of operations implemented as computer-executable instructions.

Any of blocks 202, 204, and 206 may be performed prior to block 208. Block 208 may act in response to any of these blocks or otherwise. In one embodiment, for instance, block 208 acts responsive to a call requesting a security risk of the browser.

Block 202 receives an indication that a security setting for a network browser has been altered. The security setting may have been altered by a user, another application, or malicious code. Block 204 receives an indication that a network browser has been started, such as on startup responsive to a user opening the browser. Block 206 receives a user's selection to view a network browser's security settings or security risks. This selection can be received through a control panel for the network browser or though a user interface related to the network browser's security, some of which are described below.

Block 208 determines whether one or more security settings of a network browser pose a security risk. Block 208 may do so without user interaction, such as automatically following blocks 202 or 204.

In an embodiment described with elements of environment 100, security module 118 compares the network browser's altered security settings 116 with predetermined settings/risk table 122. Each of the altered security settings corresponds to a risk assessment in table 122. The security module can assign a risk level of unsafe to the network browser's security settings if any of its settings correspond to an unsafe risk in table 122.

Figure 3:
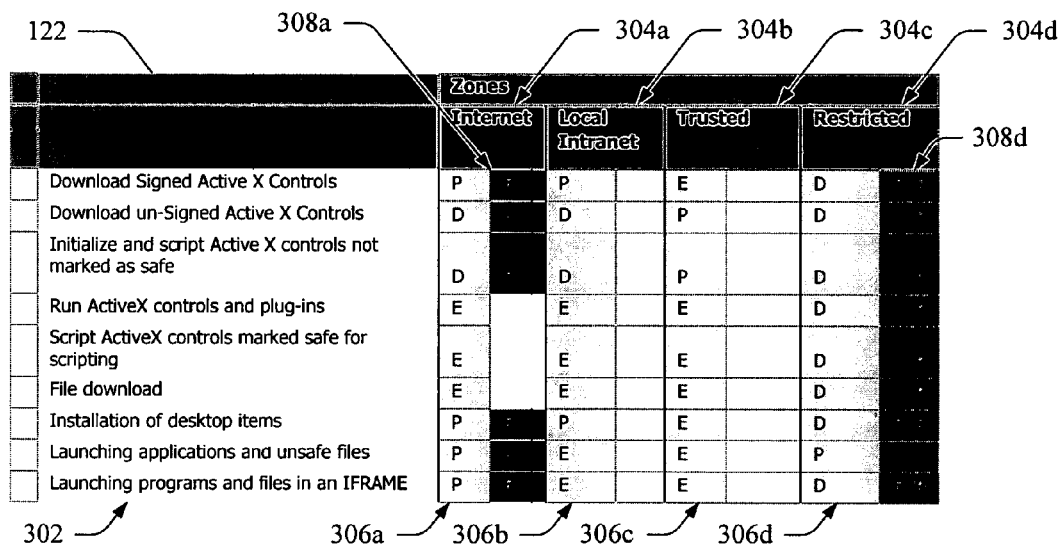
FIG. 3 illustrates an exemplary predetermined settings/risk table.

By way of illustration, consider an exemplary predetermined settings/risk table 122 shown in FIG. 3. Table 122 is broken down into potential actions 302, zones 304*a-d*, and possible security settings for these actions in their zones. Security settings and actions are shown categorized in zones, though this is not necessary. Zones may help a user understand actions based on where or how these actions can be performed.

The security settings for each action in each zone are marked "E" for enable the action, "P" for prompt a user for permission to enable the action, and "D" for disable the action. Some action/zone settings are left blank because an assessed security risk does not depend on the setting for these actions in their respective zones. Security settings on the left of each zone are considered safe settings. These safe settings may match default settings for the browser (e.g., default security settings 114). The safe settings are shown at 306*a* for Internet zone 304*a*, 306*b* for local intranet 304*b*, 306*c* for trusted zone 304*c*, and 306*d* for restricted zone 304*d*.

The security settings on each zone's right are considered unsafe (if any are marked). The unsafe settings are shown at 308*a* for Internet zone 304*a* and 308*d* for restricted zone 304*d*. As shown, a security setting enabling the following actions in the Internet zone are considered unsafe: downloading signed ActiveX controls; downloading unsigned ActiveX controls; initializing and scripting ActiveX controls not marked as safe; installing desktop items; launching applications and unsafe files; and launching programs and files in an IFRAME. Also as shown, all actions in restricted zone 304*d* are consider unsafe if they are enabled or prompted except for launching programs and files in an IFRAME. For this action in the restricted zone, a prompt security setting is considered safe and an enable security setting unsafe.

Also by way of illustration, consider exemplary altered security settings 116 shown in FIG. 4. These security settings are shown for clarity in a format similar to that of table 122 shown in FIG. 3. Possible actions are marked at 302 and zones at 304*a*, 304*b*, 304*c*, and 304*d*, which mirror those of template 122 of FIG. 3. Here the security settings for network browser 112 are shown and differ from default security settings 114.

Security module 118 compares the network browser's current security settings (here altered settings 116) with predetermined settings/risk table 122. The security module determines that three security settings are unsafe by comparing the security settings shown in FIG. 4 with those of the table shown in FIG. 3. These unsafe security settings are shown in FIG. 4: a first unsafe setting 402; a second unsafe setting 404; and a third unsafe setting 406. The first and second unsafe settings enable download of signed and unsigned ActiveX controls in the Internet zone. The third unsafe setting enables a file—if a user gives permission responsive to a prompt—to be downloaded in the restricted zone. Based on this determination, the security module assigns an unsafe risk for network browser 112's altered security settings. The security module can assign an unsafe risk to each of the three unsafe settings, the zones affected by the unsafe settings (Internet zone 304*a* and restricted zone 304*d*), and the entire set of security settings for the browser.

Block 210 notifies a user of a potential problem by notifying the user that one or more security settings pose a security risk. Block 210 may inform a user without the user's interaction, such as responsive to a user starting up the browser (e.g., block 204) or an alteration to the browser's security settings (e.g., block 202).

Block 210 can act through user interface 120 of security module 118 to inform a user through various audio and/or visual interfaces. Four exemplary visual interfaces are provided below.

Figure 5:
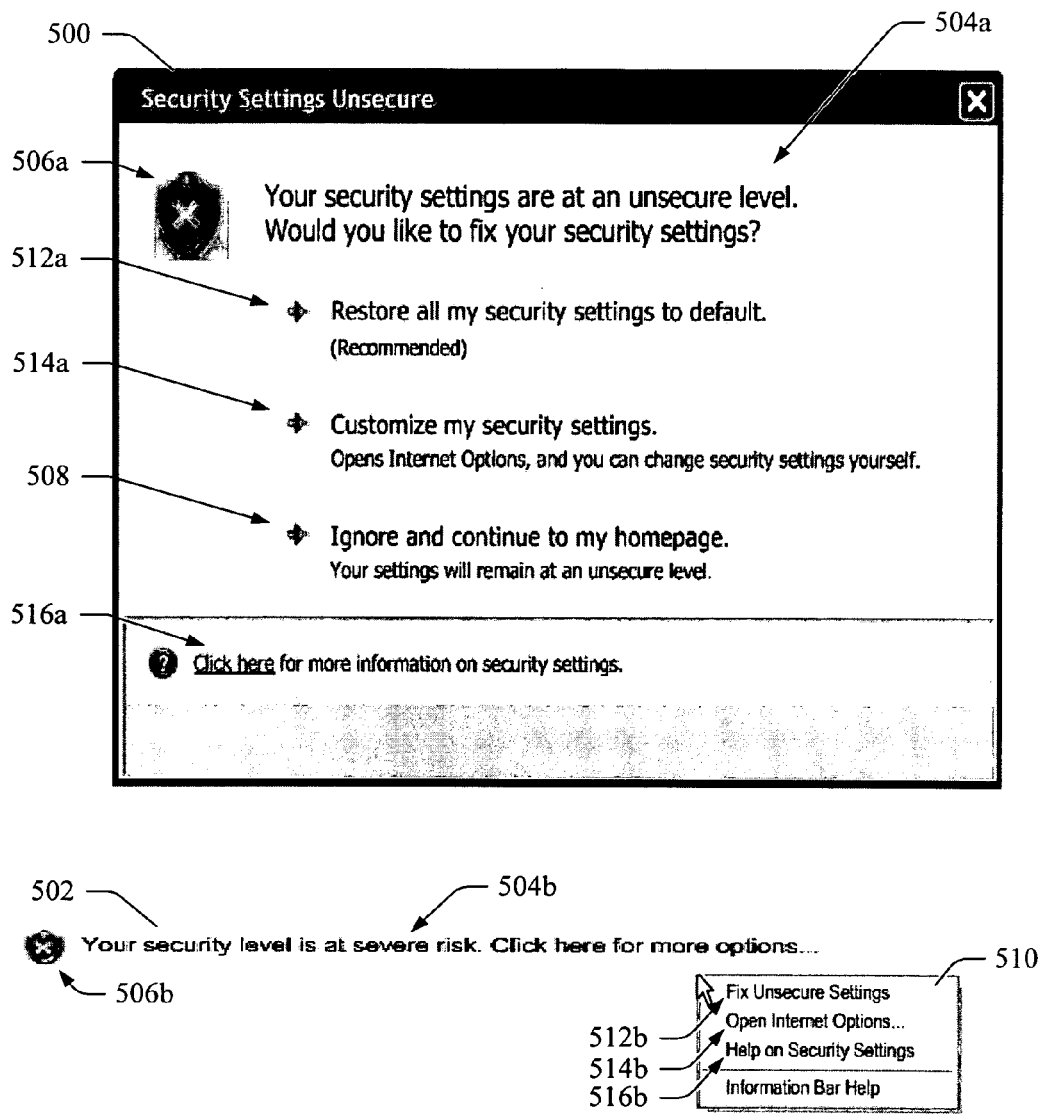
FIG. 5 illustrates exemplary notification interfaces.

Referring to FIG. 5, a dialog notification interface 500 or an information bar notification interface 502 notifies a user that a network browser's security settings are at an unsecure level. Interface 500 or 502 informs the user through text at 504*a* or 504*b* ("Your security settings are at an unsecure level." or "Your security level is at severe risk.") and a graphic warning 506*a* or 506*b*. These interfaces may do so responsive to the tools determining that a security setting poses a security risk, such as the first, second, or third unsafe settings 402, 404, and 406 shown in FIG. 4.

Block 210 can provide the notification interface in response to a network browser being started (e.g., block 204). Dialog notification interface 500 comprises an option to ignore the warning and continue startup; this is implicit in information bar notification interface 502. A user can ignore the dialog's warning by selecting ignore control 508.

Responsive to a user selecting or clicking on the information bar notification interface, additional controls are presented with options interface 510. The options interface and the dialog notification interface enable a user to fix the security problem through a restoration control 512*a* or 512*b*, proceed to an internet-options user interface (e.g., interface 600 of FIG. 6) by selecting internet-options control 514*a* or 514*b*, or proceed to a help dialog providing security settings information by selecting information control 516*a* or 516*b*.

Figure 6:
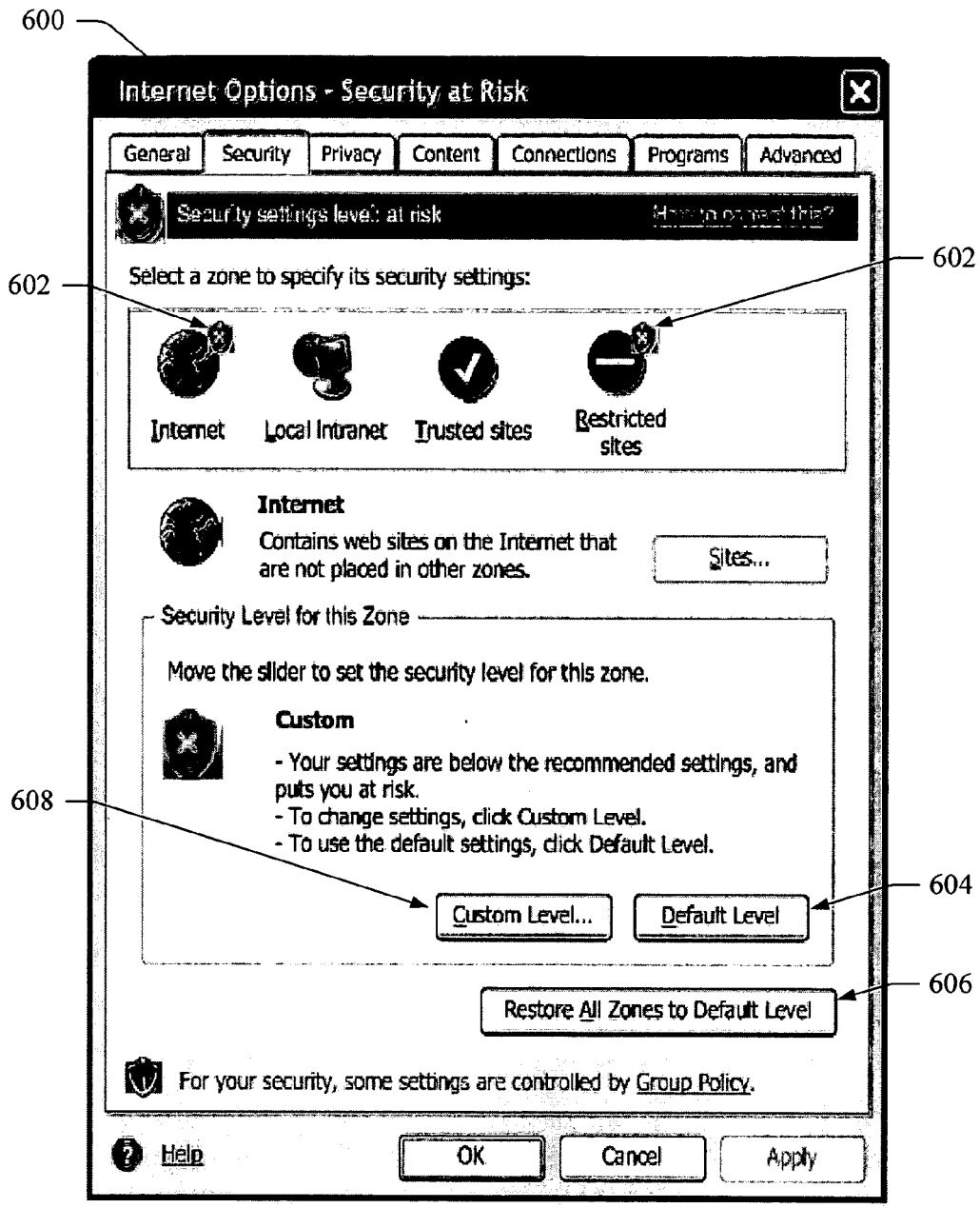
FIG. 6 illustrates an exemplary security settings interface.

Referring to FIG. 6, a security settings interface 600 provides information about a network browser's security settings. Block 210 can provide this interface responsive to a user selecting information control 516*a* or 516*b* or an alteration to a security setting determined to pose a risk. Here the information about the security settings is oriented into the four zones described previously. The security settings interface informs a user that one or more security settings in the Internet zone and the restricted zone pose a security risk. This is done with graphic warnings 602. Security module 118 can provide these warnings responsive to determining that two security settings in the Internet zone (402 and 404 of FIG. 4) and one security setting (406) in the restricted zone are unsafe.

Security settings interface 600 also enables a user to fix security problems all at once or based on a zone. The user may do so through selecting a restore-zone-to-safe-level control 604 or restore-all-zones-to-safe-level control 606. Interface 600 also enables a user to proceed to a custom user interface by selecting a zone custom control, here marked at 608. These are discussed in greater detail below.

Figure 7:
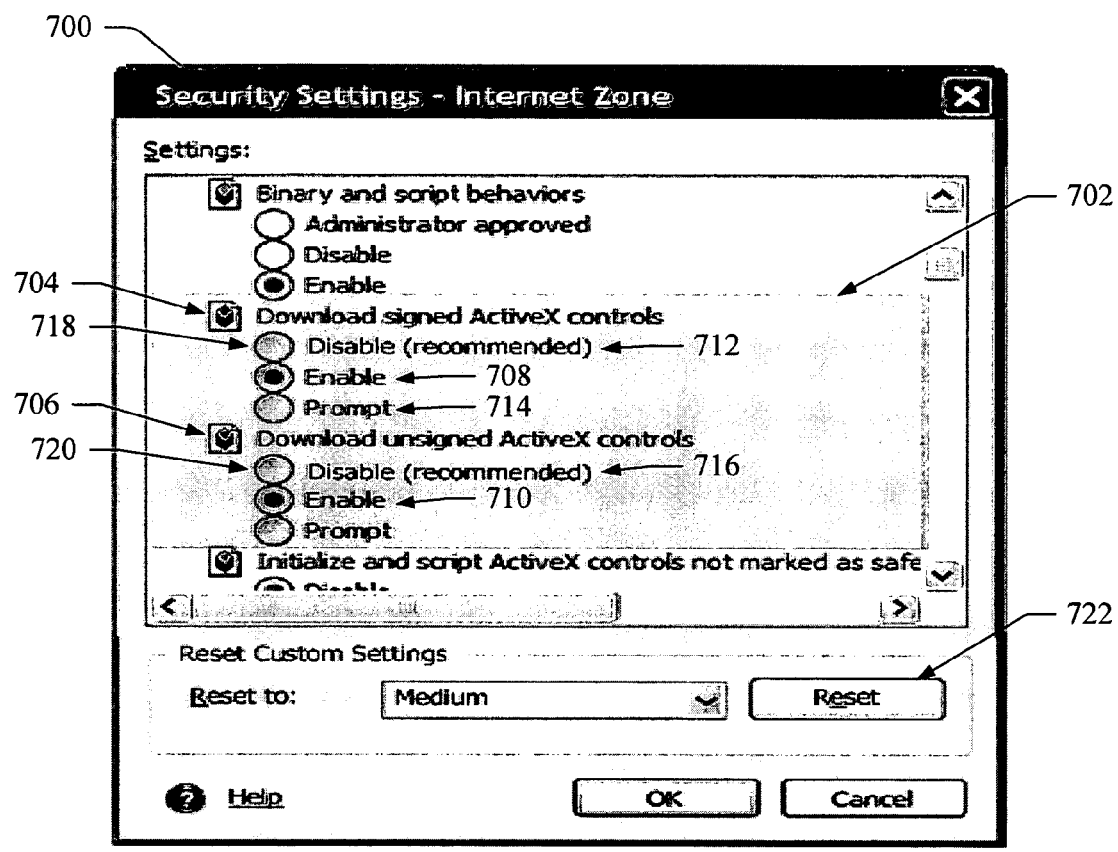
FIG. 7 illustrates an exemplary custom security settings interface.

Referring to FIG. 7, a custom security settings interface 700 is shown. Block 210 (here user interface 120) can provide this interface responsive to a user's selection to view settings or risks (e.g., block 206) such as through a control panel (not shown) or zone custom control 608 of FIG. 6.

Custom settings interface 700 provides a scrollable list of security settings for the Internet zone. The security settings that pose a security risk are highlighted (shown with shading at 702). These security settings are those noted above as posing a risk, namely first and second settings 402 and 404 of FIG. 4. These settings enable download of signed and unsigned ActiveX controls in the Internet zone.

User interface 120 informs the user of the settings that pose the security risk, the current setting, and/or the safe setting. This is shown by example in interface 700. The settings that pose the risk are marked 704 and 706 (corresponding to 402 and 404 of FIG. 4). The current setting is "Enable", which is shown at 708 and 710. The safe (recommended) setting is "Disable" for downloading signed ActiveX controls, indicated at 712, or "Prompt" (also safe but not recommended here), indicated at 714. The recommended and safe setting is "Disable" for downloading unsigned ActiveX controls, indicated at 716. Interface 700 enables alteration of the settings by selecting buttons, such as disable buttons 718 and 720. Interface 700 also provides a selectable reset settings control 722 to restore settings to a medium security level, which is considered safe.

Block 212 enables a user to reduce the security risk. Block 212 can do so through a single user action, such as pressing an enter key or clicking on a control. Block 212 can also enable this reduction in security risk by enabling a user to alter security settings one-by-one or in groups.

In the illustrated interfaces described above, user interface 120 enables a user to reduce a network browser's security risk with a single click on control 512a or 512b, control 604, control 606, button 718, button 720, or control 722. By selecting any of the controls 512a, 512b, 604, 606, or 722 a user may reduce or eliminate a security risk for multiple security settings.

For all three unsafe security settings 402, 404, and 406, block 212 enables the user to reduce or eliminate the risk posed by these settings with a single user action. User interface 120, for instance, enables a user to select restoration control 512a or 512b in notification interfaces 500 or 502, respectively, restore-all-to-safe control 606 in security settings interface 600, or selectable reset settings control 722 in custom settings interface 700. For security settings of a particular zone (e.g., either 402 and 404 or 406) block 212 enables a user to reduce or eliminate risk by selecting restore-zone-to-safe-level control 604 of the security settings interface.

Block 214 alters one or more security settings to reduce a network browser's security risk. Block 214 can do so responsive to a user's interaction, such as in response to a user selecting a control to alter security settings to a safe level.

Responsive to the user selecting to make network browser 112's security settings safe, security module 118 changes the security setting of "E" shown at 402 and 404 in FIG. 4 to "D" and the security setting of "P" at 406 to "D".

Conclusion

The above-described tools notify a user of a security risk in a network browser. They may also determine whether there is a security risk and enable a user to reduce this risk. In so doing, a user may be able to avoid or cure security risks in his or her network browser that may damage the browser or otherwise comprise his or her computer system. Although the tools have been described in language specific to structural features and/or methodological acts, it is to be understood that the subject matter defined in the appended claims is not necessarily limited to the specific features or acts described. Rather, the specific features and acts are disclosed as exemplary forms of implementing the claimed system, method, and/or computer-readable media.

The invention claimed is:

1. A computer-implemented method, comprising:
assigning a default behavior for each of a plurality of security settings in each of a plurality of zones of a network browser application, the assigning utilizing a predetermined settings/risk table that maps one of a plurality of behaviors to each of the plurality of security settings of the network browser application;
receiving an indication that one of the plurality of security settings of the network browser application has been altered;
determining, responsive to receiving the indication that the one of the plurality of security settings of the network browser application has been altered and based at least in part on the predetermined settings/risk table and a security risk assessment associated with the plurality of behaviors in the plurality of zones, without user interaction, that the one of the plurality of security settings of the network browser application that has been altered poses a security risk;
notifying a user of the security risk in response to the determining via a notification that includes a selectable option to ignore the security risk;
presenting an explanation indicating why the one of the plurality of security settings poses the security risk;
presenting the user, responsive to the determining and unless the selectable option to ignore the security risk is selected, with an option to restore the plurality of security settings in one of the plurality of zones to the default behaviors for the one of the plurality of zones and an option to restore the plurality of security settings in the plurality of zones to the default behaviors for the plurality of zones; and
in response to a single user selection, restoring the plurality of security settings in the one of the plurality of zones to the default behaviors for the one of the plurality of zones or restoring the plurality of security settings in the plurality of zones to the default behaviors for the plurality of zones.

2. The method of claim 1, further comprising notifying the user of the security risk without user interaction.

3. The method of claim 1, further comprising, in response to notifying the user of the security risk, presenting to the user an option to alter the one of the plurality of security settings effective to reduce the security risk.

4. The method of claim 3, further comprising presenting a user interface to the user showing the one of the plurality of security settings, the user interface including one or more selectable changes to the one of the plurality of security settings capable of reducing the security risk.

5. The method of claim 1, further comprising determining that the one of the plurality of security settings of the network browser application poses a security risk includes assigning a risk level of either unsafe or safe.

6. A computer-implemented method, comprising:
assigning a default behavior for each of a plurality of security settings in each of a plurality of network zones of a network browser application, the assigning utilizing a predetermined settings/risk table that maps one of a plurality of behaviors to each of the plurality of security settings of the network browser application;

receiving an indication that one or more of the plurality of security settings of the network browser application have been altered;

determining, responsive to receiving the indication that the one or more of the plurality of security settings of the network browser application have been altered and based at least in part on the predetermined settings/risk table and a security risk assessment associated with the plurality of behaviors in the plurality of network zones, that the one or more of the plurality of security settings of a network browser that have been altered pose a security risk, the security risk assessment not assessing a risk of the one or more of the plurality of settings for at least one of the plurality of network zones that do not depend on the respective one or more of the plurality of security settings;

notifying a user of the security risk in response to the determining;

presenting an explanation indicating why the one or more of the plurality of security settings of the network browser that have been altered pose the security risk;

presenting to the user, responsive to the determining, with an option to restore the plurality of security settings in one of the plurality of network zones to the default behaviors and an option to restore the plurality of security settings in the plurality of zones to the default behaviors; and in response to a single user selection, restoring the plurality of security settings in the one of the plurality of network zones to the default behaviors or restoring the plurality of security settings in the plurality of network zones to the default behaviors.

7. The method of claim 6, wherein the presenting to the user the option to restore the plurality of security settings in the one of the plurality of network zones to the default behaviors for the one of the plurality of zones and the option to restore the plurality of security settings in the plurality of zones to the default behaviors for the plurality of zones further comprises;

presenting selectable controls; and altering the one or more of the plurality of security setting(s) in response to receiving a user selection of one of the selectable controls.

8. A system comprising:

one or more processors;

one or more computer-readable storage media having computer-readable instructions stored therein that, when executed by the one or more processors, causes the one or more processors to implement a user interface comprising:

a first region having a first indication indicating a security risk for a network browser based on one or more of a plurality of security settings for each of a plurality of network zones of the network browser, a first visual selectable control that is selectable to cause the security risk to be ignored, and a second indication indicating that selection of the first visual selectable control is effective to ignore the security risk;

an explanation indicating why the one or more of the plurality of security settings pose the security risk;

a second region having a second visual selectable control that is selectable to cause the security risk to be reduced, a third indication indicating that selection of the second visual selectable control is effective to reduce the security risk, a third visual selectable control that is selectable to restore the plurality of security settings for one of the plurality of network zones to a safe level with a single user action, and a fourth visual selectable control that is selectable to restore the plurality of security settings for the plurality of network zones to a safe level with a single user action; and a third region displaying the one or more of the plurality of security settings that pose the security risk, the one or more of the plurality of security settings being associated with a behavior selected from a group comprising enable, disable, or prompt.

9. The system of claim 8, wherein the third indication indicates that one or more of the plurality of security settings of the network browser will be made safe in response to selecting the second visual selectable control.

10. The system of claim 8, wherein the third indication indicates that a plurality of security settings of the one of the plurality of network zones will be made safe.

11. The system of claim 8, wherein the third indication indicates that the plurality of security settings of the plurality of network zones will be made safe.

12. The system of claim 8, wherein the computer-readable instructions, when executed by the one or more processors, cause the one or more processors to perform further acts comprising receiving selection of the second visual selectable control with a single user action.

* * * * *